US 8,089,842 B2

(12) United States Patent
Liu et al.

(10) Patent No.: US 8,089,842 B2
(45) Date of Patent: Jan. 3, 2012

(54) SYSTEM AND METHOD FOR CONTROLLING DATA RECORDING PROCESS OF OPTICAL RECORDING MEDIUM IN SEQUENTIAL WRITING

(75) Inventors: Tun-hsing Liu, Pingjhen (TW);
Hong-ching Chen, Fongshan (TW);
Yu-wei Ling, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 1206 days.

(21) Appl. No.: 11/696,570

(22) Filed: Apr. 4, 2007

(65) Prior Publication Data
US 2007/0274194 A1 Nov. 29, 2007

Related U.S. Application Data

(60) Provisional application No. 60/808,388, filed on May 25, 2006.

(51) Int. Cl.
*G11B 7/00* (2006.01)
(52) U.S. Cl. .................... 369/59.11; 369/59.12
(58) Field of Classification Search ........... 369/59.11, 369/59.12
See application file for complete search history.

(56) References Cited

U.S. PATENT DOCUMENTS

| 5,754,522 | A | 5/1998 | Kobayashi et al. |
| 6,067,281 | A | 5/2000 | Kobayashi et al. |
| 6,791,922 | B2 | 9/2004 | Suzuki |
| 7,239,585 | B2 | 7/2007 | Sawabe et al. |
| 7,626,909 | B2 * | 12/2009 | Tachino et al. ............ 369/59.25 |
| 2004/0136286 | A1 * | 7/2004 | Nishimura et al. ........ 369/47.28 |
| 2005/0122870 | A1 * | 6/2005 | Hwang et al. ............. 369/53.15 |
| 2006/0023601 | A1 | 2/2006 | Tachino et al. |

* cited by examiner

Primary Examiner — Latanya Bibbins

(57) ABSTRACT

A system and method of controlling data recording process of optical recording medium in a sequential writing are described. The control system comprises an information unit, a data-preparing unit and a recording controller. The information unit generates an information signal. The data-preparing unit prepares the data for recording. The data is then transformed into a writing signal according to the information signal. The recording controller controls the data-preparing unit to adjust the writing signal while acquiring the information signal during a sequential writing. Thus, the recording controller adjusts the writing signal according to the information signal. The data-preparing unit outputs the adjusted writing signal having desired recording area and undesired recording area and the adjusted writing signal is recorded on the optical recording medium during the sequential writing. The adjusted writing signal is outputted to OPU. The OPU performs a recording process of the optical recording medium.

24 Claims, 19 Drawing Sheets

SYSTEM AND METHOD FOR CONTROLLING DATA RECORDING PROCESS OF OPTICAL RECORDING MEDIUM IN SEQUENTIAL WRITING

CROSS REFERENCE TO RELATED APPLICATION

This patent application claims priority from U.S. Provisional Patent Application Ser. No. 60/808,388, which are filed on May 25, 2006 and incorporated herein by reference.

FIELD OF THE INVENTION

The present invention relates to a control system and method, and more particularly to a system and method of controlling data recording process of optical recording medium by adjusting writing signal to record the adjusted writing signal on the optical recording medium in a sequential writing.

BACKGROUND OF THE INVENTION

FIG. 1 is a schematic block diagram of a conventional recording system 100 and an optical recording medium 112. Data 102 from the data source 104 are encoded by an eight-fourteen-modulation (EFM) encoder 106 to generate EFM encoded data. The encoded data are then transformed into write-strategy data by a write-strategy (WSR) unit 108 and transmitted to an optical pick-up (OPU) 110. Finally, the OPU 110 emits laser power onto an optical recording medium 108 according to the write-strategy data, and then forms a land/pit profile on the optical recording medium 112 via control circuit 114.

FIG. 2 is a schematic timing diagram of a conventional recording process performed by the recording system 100 in FIG. 1. When data 102 and target starting position 200 on the disk address are ready, the OPU 110 is controlled to seek the front of the target starting position 200 and perform a tracking and following procedure to track the target starting position 200 during an OPU action. The record-initialized functions are actuated during the period 202 and target-search criterion need to be taken during the period 204. When reaching the target starting position 200, the OPU 110 emits light to write the data 102 onto the optical recording medium 112 according to a writing signal. That is, a latency period 206 to start the recording process on the recording medium 112 is the sum of period 202 and the period 204.

According to the above description, the data 102 that are transformed into the write-strategy data will be written onto a section of the optical recording medium 112. While the section has some areas that are not desired to be recorded, the recording system 100 has to divide the data 102 into several parts to part-record the desired areas. However, when the recording system 100 performs the part-recording process to pass the undesired recording areas, there are some drawbacks.

The first drawback: when the two adjacent desired areas (300, 302) are too close so that the recording system 100 cannot track the next starting position 200, the recording system 100 wastefully has to seek a proper position to let the OPU 110 track on the next starting position 200. As shown in FIG. 3A, it is a schematic timing diagram of conventional part-recording process performed by the recording system 100 in FIG. 1. When the two adjacent areas (300, 302) are too close, it is necessary to reserve enough latency period 206 for performing seeking, tracking and following procedures on the disk address to track the next starting position 200 during the OPU action. However, the sum of period 202 and target-search criterion period 204 is smaller than the required latency period 206 in the writing procedure. As a result, these procedures are repeatedly performed, resulting in efficiency decrement of the recording system 100.

The second drawback: even when the two desired areas (300, 302) are far enough for the recording system 100 to track on the next starting position 200, the recording system 100 still cannot meet the criteria to start next recording 200 because the poor quality 306 of the optical recording medium 112 or the unreliable detection 308 of the disk address during the tracking and following procedures. Referring to FIGS. 3B and 3C, they are schematic timing diagrams of conventional part-recording process performed by the recording system 100 in FIG. 1 when the quality of the optical recording medium 112 is poor 306 or the detection of the physical address 308 on the disk address is unreliable during the writing procedure. In FIG. 3B, the OPU 110 cannot find the next starting position 200 during target-found 310 even if the sum of period 202 and target-search criterion period 204 is greater than the required latency period 206. Therefore, the writing procedure of the recording system 100 fails. Further, the recording system 100 must further perform several seeking steps, including target-search criterion periods 204, to move the OPU 110 a distance, which causes much more latency and cannot actuate the writing signal 312 and the writing procedure 314, as shown in FIG. 3C.

In conventional Digital Versatile Disk Random Access Memory (DVD-RAM), when data are recorded in sectors of the optical recording medium, header in the Complementary Allocated Pit Addressing (CAPA) area would be skipped. However, the header does not correspond to the writing signal of the write-strategy unit 108 due to a skip. Further, the header cannot be addressed by the control circuit. Therefore, the header information cannot be written on the optical recording medium precisely. In addition, when data are recorded on the DVD-RAM, the defect areas in the Primary Defect List (PDL) are slipped and results in discontinuous recorded addresses. However, the writing signal corresponding to the discontinuous recorded addresses fail to be identified due to the slip.

Consequently, there is a need to develop a control system to solve the problems.

SUMMARY OF THE INVENTION

The first objective of the present invention is to provide a system and method of controlling data recording process of the optical recording medium in a sequential writing to solve the problem of tracking next starting position when two adjacent desired areas on the optical recording medium are too close.

The second objective of the present invention is to provide a system and method of controlling data recording process of the optical recording medium in a sequential writing to improve the poor quality or the unreliable detection of address on the optical recording medium.

According to the above objectives, the present invention sets forth a system and method of controlling data recording process in a sequential writing The control system for controlling a recording process of an optical recording medium comprises an information unit, a data-preparing unit and a recording controller.

The information unit generates an information signal. The data-preparing unit is coupled to the information unit receives data from a data source and prepares the data for recording.

The data is then transformed into a writing signal according to the information signal. The recording controller coupled to the information unit and the data-preparing unit controls the data-preparing unit to adjust the writing signal while acquiring the information signal from the information unit during a sequential writing. Thus, the recording controller adjusts the writing signal according to the information signal. The data-preparing unit outputs the adjusted writing signal having desired recording area and undesired recording area and the adjusted writing signal is recorded on the optical recording medium during the sequential writing. The adjusted writing signal is outputted to optical pick-up (OPU). The OPU then emits light corresponding to the adjusted writing signal to perform a recording process of the optical recording medium during the sequential writing.

In one embodiment of the present invention, the information unit comprises a reference clock generator coupled to the data-preparing unit for supplying the data-preparing unit with a reference clock signal which serves as the information signal. The data-preparing unit further comprises a modulation unit coupled to the reference clock generator for modulating the data into a modulated signal to generate the writing signal according to the reference clock signal. The recording controller adjusts the modulation signal based on the reference clock signal and controls the modulation unit to generate the writing signal. The data-preparing unit also comprises a write-strategy unit coupled to the reference clock generator for converting the data into the writing signal according to the reference clock signal. The recording controller adjusts the writing signal based on the reference clock signal and controls the write-strategy unit to generate the writing signal. The recording controller counts the reference clock signal to adjust the position and length of the desired recording area and undesired recording areas in the writing signal.

In another embodiment of the present invention, the information unit comprises an address detector coupled to the data-preparing unit for supplying the recording controller with an address signal. The address signal is used to serve as the information signal corresponding to the optical recording medium. The modulation unit coupled to the recording controller for modulating the data into a modulated signal and the recording controller controls the modulation unit for adjusting the modulation signal based on the address signal to generate the writing signal. The write-strategy unit coupled to the recording controller for converting the data into the writing signal and the recording controller controls the write-strategy unit for adjusting the writing signal based on the address signal to generate the writing signal. The recording controller detects the address signal to adjust the position and length of the desired recording area and undesired recording areas in the writing signal.

Preferably, the address detector supplies recording controller with the address information recorded on the optical recording medium by decoding the reflection light when the OPU emits light onto the optical recording medium and receives the reflection light from the optical recording medium. The recording controller adjusts desired and undesired recording areas in the writing signal according to the address information. Thus, the OPU receives the adjusted writing signal from the write-strategy unit and emits light corresponding to the adjusted writing signal on the optical recording medium. Preferably, the modulation unit includes an EFM encoder, a variety of data encoders or the like applicable to the optical system.

More specifically, each of units, e.g. modulation unit and write-strategy unit, between the data source and the OPU is capable of generating its own signal. The signal from one unit, i.e. modulation or write-strategy unit, is transmitted to the next, i.e. write-strategy unit or OPU, respectively. Consequently, while performing a part-recording process, the control system controls the data-preparing unit to adjust the writing signal so that the data-preparing unit records the adjusted writing signal having undesired and desired areas on the optical recording medium during a sequential writing.

In operation, the control method of data recording an optical recording medium is described as following steps: (a) an information unit generates an information signal; (b) data-preparing unit prepares data according to the information signal; (c) data-preparing unit transforms the data into a writing signal according to the information signal; (d) the recording controller then controls the data-preparing unit to allow the recording controller to adjust the writing signal based on the information signal during a sequential writing to generate the adjusted writing signal having desired recording area and undesired recording area; and (e) the adjusted writing signal is recorded on the optical recording medium during the sequential writing.

In one embodiment, a reference clock signal is supplied to the data-preparing unit for operation. During the step (c), the data is modulated into a modulated signal according to the reference clock signal. The recording controller adjusts the modulation signal based on the reference clock signal. Preferably, the recording controller adjusts the position and length of the desired recording area and undesired recording areas in the writing signal by counting the reference clock signal.

In another embodiment, an address detector generates an address signal serving as the information signal corresponding to the optical recording medium. The address signal is supplied to data-preparing unit for detection. During the step (c), the data is modulated into a modulated signal according to the address signal. The recording controller adjusts the modulation signal based on the address signal. Preferably, the recording controller adjusts the position and the length of the desired recording area and undesired recording areas in the writing signal by counting the address signal.

The advantages of the present invention mainly include: (a) avoiding invalid tracking of the next starting position when two adjacent desired areas in the optical recording medium are too close; and (b) improving the poor quality or the unreliable detection of physical address.

DETAILED DESCRIPTION OF THE PREFERRED EMBODIMENTS

The present invention is directed to a system and method of controlling data recording process of the optical recording medium in a sequential writing to correctly track next starting position when two adjacent desired areas on the optical recording medium are too close. Furthermore, the system and method of controlling data recording process can adjust writing signal between data source and an optical pick-up (OPU) to record the adjusted writing signal on the optical recording medium in a sequential writing to improve the poor quality or the unreliable detection of physical address on the optical recording medium.

Figure 1:
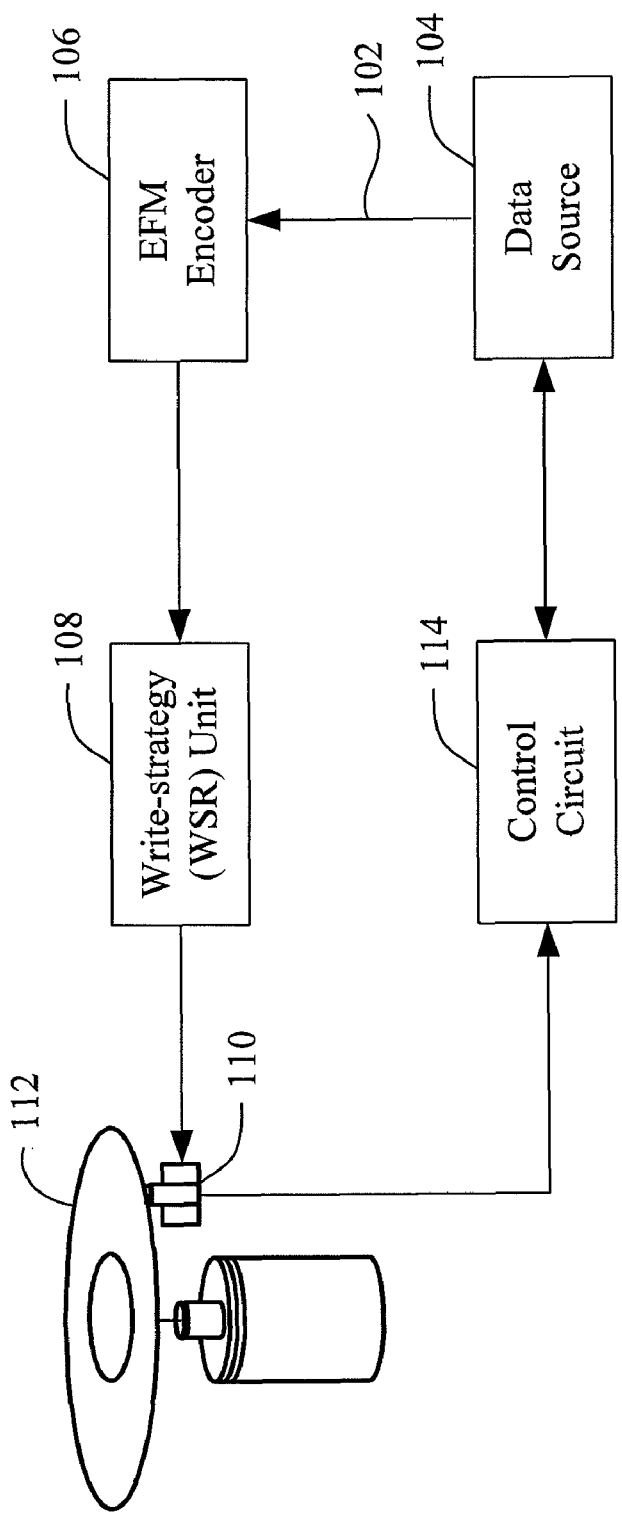
FIG. 1 is a schematic block diagram of a conventional recording system and an optical recording medium.
Figure 2:
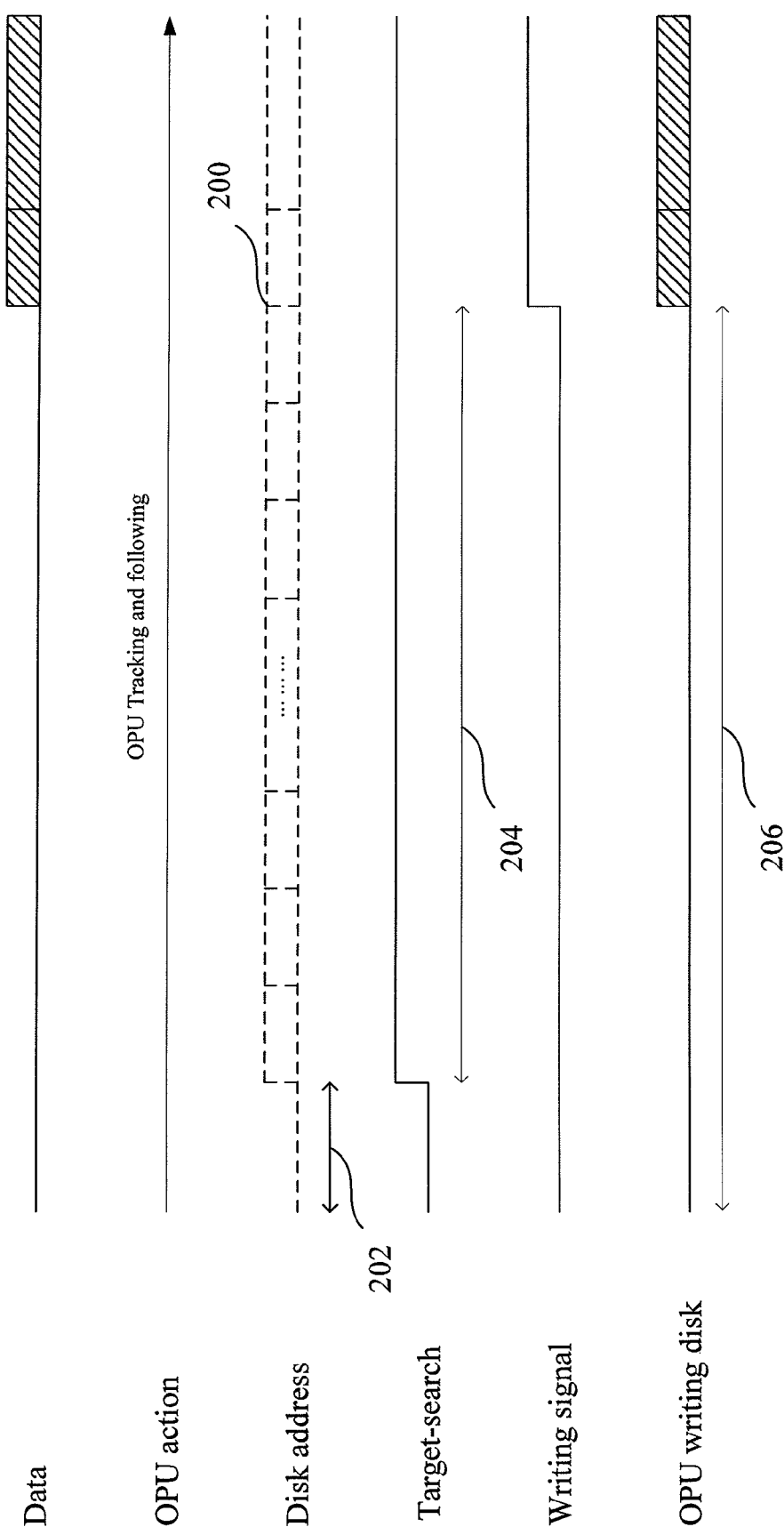
FIG. 2 is a schematic timing diagram of a conventional recording process performed by the recording system in FIG. 1.
Figure 3A:
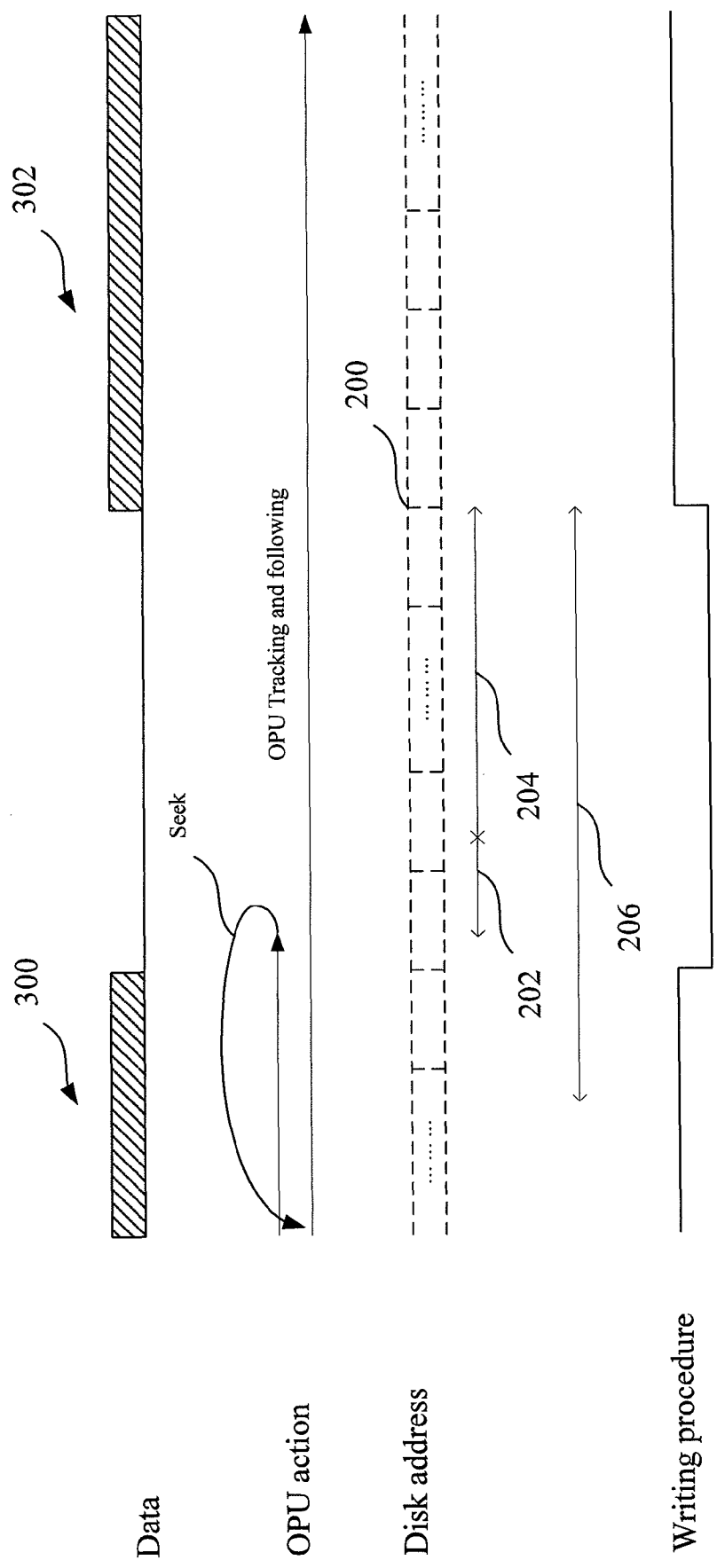
FIG. 3A is a schematic timing diagram of conventional part-recording process performed by the recording system in FIG. 1 when the two adjacent areas are too close.
Figure 3B:
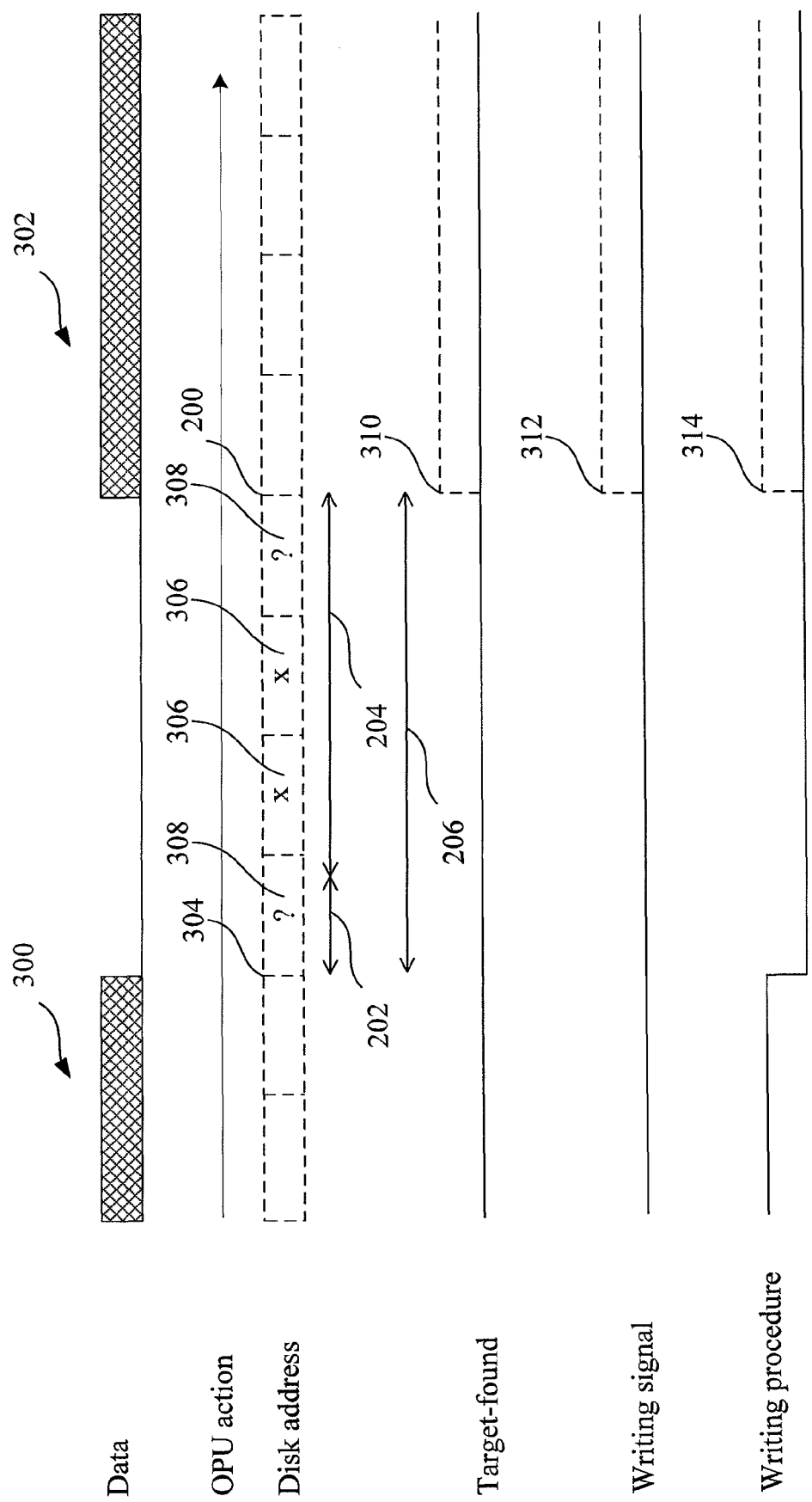
FIGS. 3B and 3C are schematic timing diagrams of conventional part-recording process performed by the recording system in FIG. 1 when the quality of the optical recording medium is poor or the detection of the physical address is unreliable.
Figure 3C:
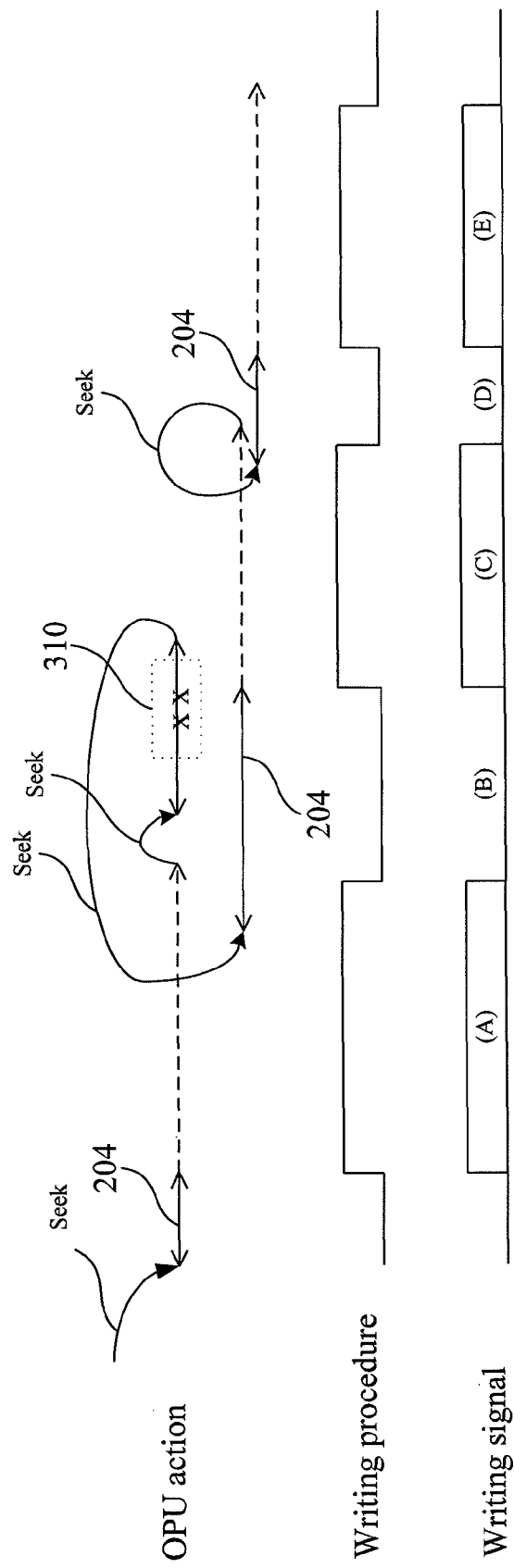
Figure 4:
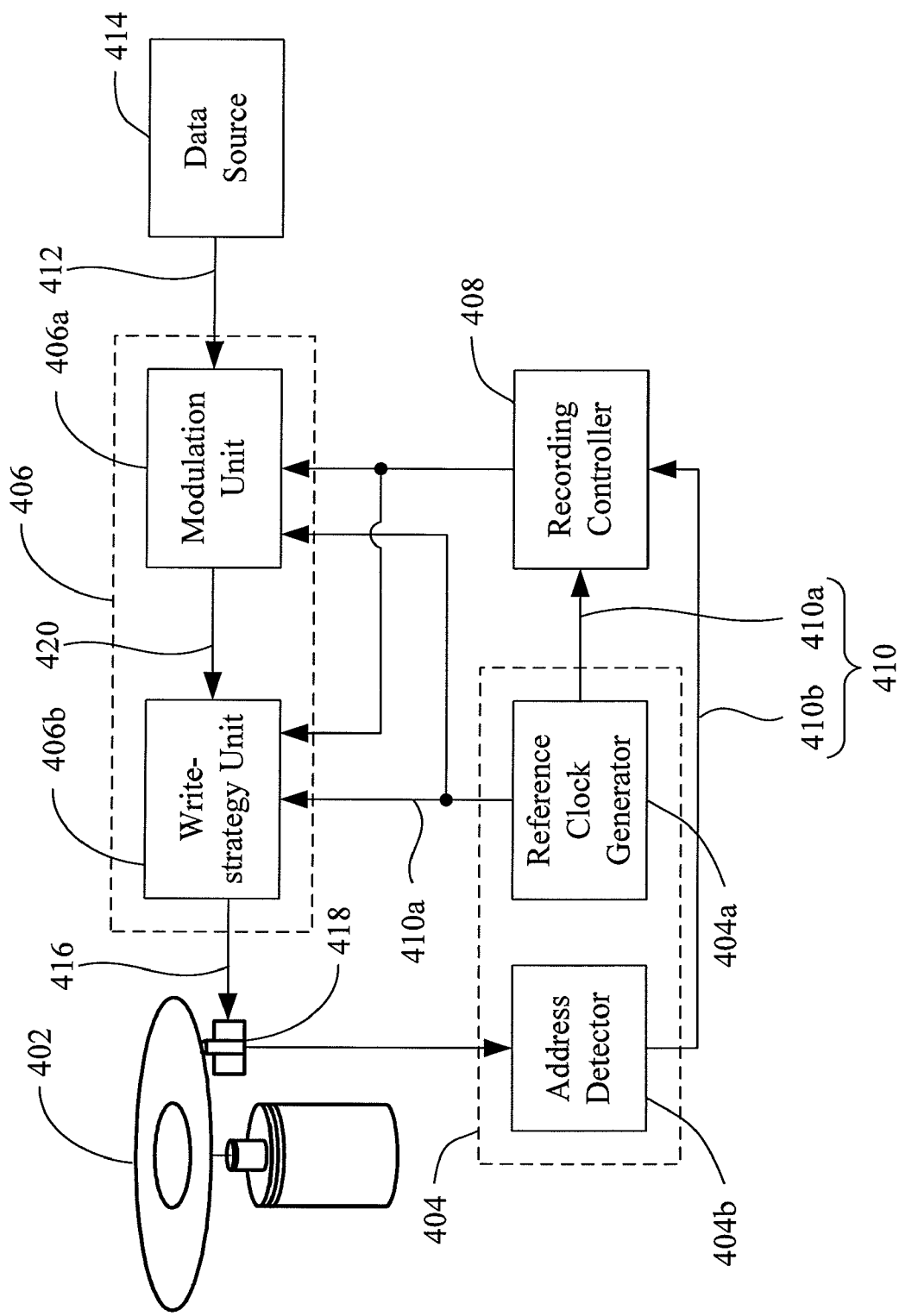
FIG. 4 is a schematic block diagram of a control system according to one preferred embodiment of the present invention.

FIG. 4 is a schematic block diagram of a control system 400 according to one preferred embodiment of the present invention. The control system 400 for controlling a recording process of an optical recording medium 402 comprises an information unit 404, a data-preparing unit 406 and a recording controller 408.

The information unit 404 generates an information signal 410. The data-preparing unit 406 is coupled to the information unit 404 receives data 412 from a data source 414 and prepares the data content for recording. The data 412 is then transformed into a writing signal 416 according to the information signal 410. The recording controller 408 coupled to the information unit 404 and the data-preparing unit 406 controls the data-preparing unit 406 to adjust the writing signal 416 while acquiring the information signal 410 from the information unit 404 during a sequential writing. Thus, the recording controller 408 adjusts the writing signal 416 according to the information signal 410. The data-preparing unit 406 outputs the adjusted writing signal 416 having desired recording area and undesired recording area and the adjusted writing signal 416 is recorded on the optical recording medium 402 during the sequential writing. The adjusted writing signal 416 is outputted to OPU 418. The OPU 418 then emits light corresponding to the adjusted writing signal 416 to perform a recording process of the optical recording medium 402 during the sequential writing.

In one embodiment of the present invention, the information unit 404 comprises a reference clock generator 404a coupled to the data-preparing unit 406 for supplying the data-preparing unit 406 with a reference clock signal 410a. The reference clock signal 410a serves as the information signal 410 and operation timing of the data-preparing unit 406 for outputting the writing signal 416. The data-preparing unit 406 further comprises a modulation unit 406a coupled to the reference clock generator 404a for modulating the data 412 into a modulated signal 420 to generate the writing signal 416 according to the reference clock signal 410a. The recording controller 408 adjusts the modulation signal 420 based on the reference clock signal 410a and controls the modulation unit 406a to generate the writing signal 416. The data-preparing unit 406 also comprises a write-strategy unit 406b coupled to the reference clock generator 404a for converting the data 412 into the writing signal 416 according to the reference clock signal 410a. The recording controller 408 adjusts the writing signal 416 based on the reference clock signal 410a and controls the write-strategy unit 406b to generate the writing signal 416. The recording controller 408 counts the reference clock signal 410a to adjust the position and length of the desired recording area and undesired recording areas in the writing signal 416.

In another embodiment of the present invention, the information unit 404 comprises an address detector 404b coupled to the data-preparing unit 406 for supplying the recording controller 408 with an address signal 410b. The address signal 410b is used to serve as the information signal 410 which corresponds to the information on the optical recording medium 402. The modulation unit 406a coupled to the recording controller 408 for modulating the data 412 into a modulated signal 420 and the recording controller 408 controls the modulation unit 406a for adjusting the modulation signal 420 based on the address signal 410b to generate the writing signal 416. The write-strategy unit 406b coupled to the recording controller 408 for converting the data 412 into the writing signal 416 and the recording controller 408 controls the write-strategy unit 406b for adjusting the writing signal 416 based on the address signal 410b to generate the writing signal 416. The recording controller 408 detects the address signal 410b to adjust the position and length of the desired recording area and undesired recording areas in the writing signal 416.

Preferably, the address detector 404b supplies recording controller 408 with the address information recorded on the optical recording medium 402 by decoding the reflection light when the OPU 418 emits light onto the optical recording medium 402 and receives the reflection light from the optical recording medium 402. The recording controller 408 adjusts desired and undesired recording areas in the writing signal 416 according to the address information. Thus, the OPU 418 receives the adjusted writing signal 416 from the write-strategy unit 406b and emits light corresponding to the adjusted writing signal 416 on the optical recording medium 402. Preferably, the modulation unit 406a includes an EFM encoder, a variety of data encoders or the like applicable to the optical system.

More specifically, each of units, e.g. modulation unit 406a and write-strategy unit 406b, between the data source 414 and the OPU 418 is capable of generating its own signal. The signal from one unit, i.e. modulation or write-strategy unit (406a, 406b), is transmitted to the next, i.e. write-strategy unit 406b or OPU 418, respectively. Consequently, while performing a part-recording process, the control system 400 controls the data-preparing unit 406 to adjust the writing signal 416 so that the adjusted writing signal 416 having undesired and desired areas is recorded on the optical recording medium 402 during a sequential writing.

Figure 5A:
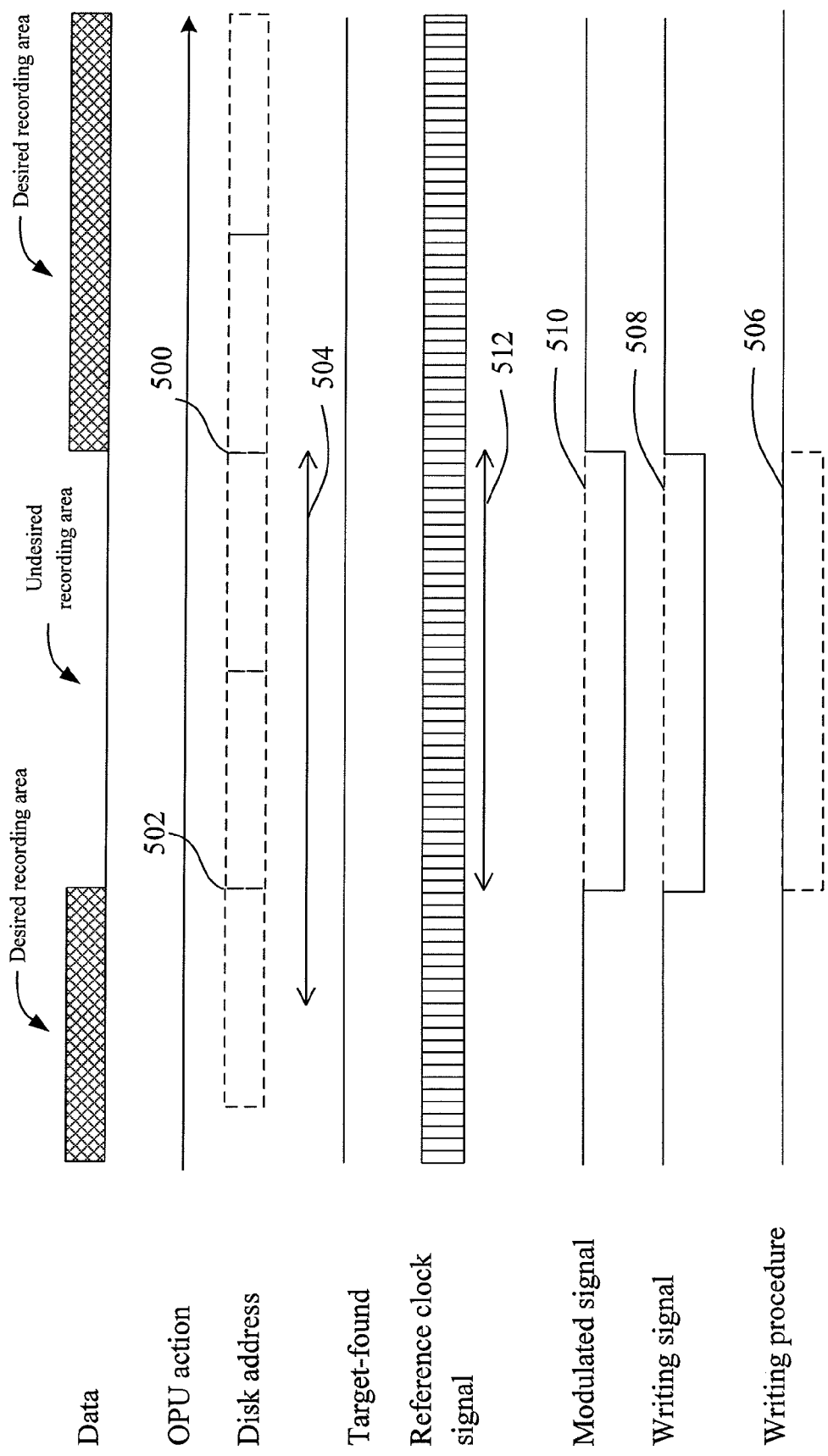
FIG. 5A is a schematic timing diagram of a control system in FIG. 4 according to one embodiment of the present invention.

FIG. 5A is a schematic timing diagram of a control system 400 in FIG. 4 according to one embodiment of the present invention. The recording controller 408 correctly tracks next starting position 500 when two adjacent desired recording areas on the optical recording medium 402 are too close. When the data 412 and the next starting position 500 of the disk address are ready for data recording, the OPU 418 is controlled to seek the front of the next starting position 500 during the OPU action. Then, the OPU 418 performs tracking and following procedure from the previous stop position 502 to the next starting position 500 of the disk address in a sequential writing.

During a writing procedure, the reference clock generator 404a supplies the modulation unit 406a and the write-strategy unit 406b with the reference clock signal 410a. The modulation unit 406a modulates the data 412 into a modulated signal 420 according to the reference clock signal 410a. The write-strategy unit 406b then converts the modulated signal 420 into the writing signal 416 according to the reference clock signal 410a. While reaching the next starting position 500 to complete the target-found during the OPU action, the OPU 418 emits light, which corresponds to the writing signal 416 from the write-strategy unit 406b, onto the disk address of the recording optical medium 402.

More importantly, when receiving the reference clock signal 410a provided for the modulation unit 406a and the write-strategy unit 406b, the recording controller 408 calculates the period of undesired recording area between the previous stop position 502 and the next starting position 500 by counting the reference clock signal 410a or address signal 410b. That is, while performing the writing procedure 506, at least one of the modulated signal 420 and the writing signal 416 is adjusted, as shown in numbers 508 and 510, by keeping on referring the reference clock signal 410a or address signal 410b, as shown in number 512 for the reference clock signal 410a. Although the period of undesired recording area is smaller than a latency period 504, the recording controller 408 can correctly track the next starting position 500 during the OPU action. The latency period 504 to start the recording process on the recording medium 402 is defined as the sum of period of record-initialized functions and the period of target-search criterion.

Therefore, the control system 400 rapidly starts a part-recording process when a next starting position 500 and a previous stop position 502 on the disk address are too close. Thus, there is no need to reserve enough latency periods 504 for recording the writing signal 416 so as to avoid much more save seeking, tracking and following processes, thereby increasing the efficiency of the control system 400.

Persons skilled in the art should be noted that a sequential writing comprises performing one or more steps including tracking and following, writing activation, target-search and target-found, and light emission onto the optical recording medium 402. On the one hand, the starting of writing procedure in the optical system comprises performing one or the combination of the following operations: (1) the recording controller 408 resets or enables the sequential writing; and (2) the recording controller 408 activates the adjustment of the modulated or writing signals (420, 416). On the other hand, the stop of writing procedure comprises performing one or the combination of the following operations: (1) reaching the end address on the optical recording medium 402; (2) the recording controller 408 disables the sequential writing; and (3) disabling the adjustment of the modulated signal 420 or the writing signal 416.

Figure 5B:
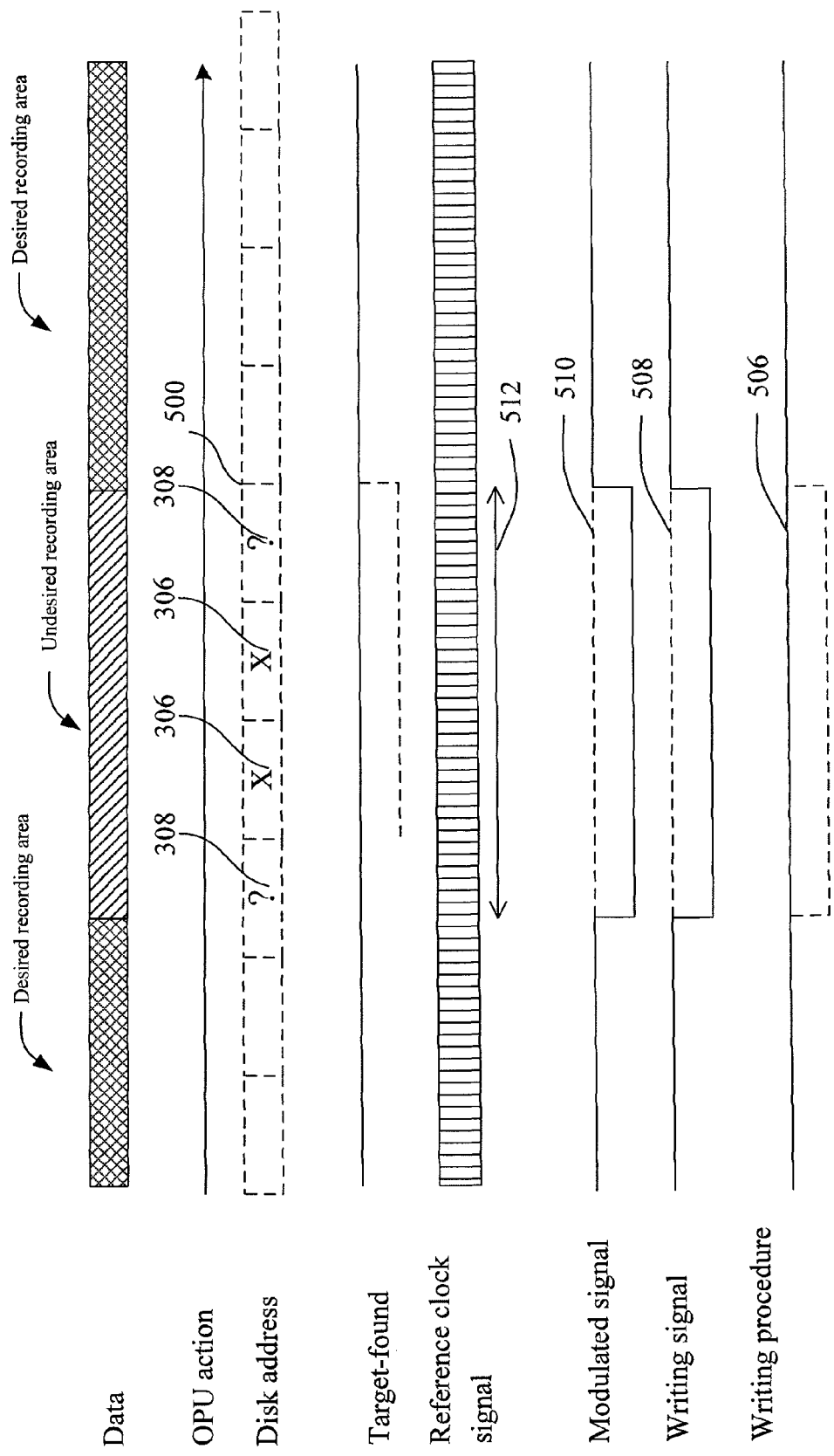
FIG. 5B is a schematic timing diagram of a control system in FIG. 4 according to another embodiment of the present invention.

FIG. 5B is a schematic timing diagram of a control system in FIG. 4 according to another embodiment of the present invention. The recording controller 408 detects the poor quality addresses and the unreliable addresses on the optical recording medium. When the data 412 are ready for data recording, the OPU 418 is controlled to seek the front of the starting position 500 during the OPU action. Then, the OPU 418 performs tracking and following procedure onto the disk address in a sequential writing.

Similar to FIG. 5A, in a writing procedure, the reference clock generator 404a provides the reference clock signal 410a. The data 412 is modulated into a modulated signal 420 according to the reference clock signal 410a. The modulated signal 420 is then converted into the writing signal 416 according to the reference clock signal 410a. While reaching the starting position 500 during the OPU action, the OPU 418 emits light, which corresponds to the writing signal 416, onto the disk address of the recording optical medium 402.

By receiving the reference clock or address signals (410a, 410b), the recording controller 408 can identifies the desired and undesired recording area. Specifically, the recording controller 408 calculates the period of undesired recording area, including the poor quality addresses 306 and the unreliable addresses 308 on the disk address, by counting the reference clock or the address signals (410a, 410b). The recording controller 408 tracks the starting position 500 during the OPU action. That is, the recording controller 408 identifies the undesired recording area by keeping on referring the reference clock signal 410a or address signal 410b, as shown in number 512 for the reference clock signal 410a until the target-found process is complete to correctly track the starting position 500 during the sequential writing. Further, while performing the writing procedure 506, at least one of the modulated signal 420 and the writing signal 416 is adjusted, as shown in numbers 508 and 510. As a result, due to the period calculation of undesired recording area, much more save seeking, tracking and following processes are avoided.

Preferably, the starting and end positions of the optical recording medium 402 are addressable and measured in various record units. The record units, e.g. error correct code (ECC), and logical start and stop positions of the optical recording medium 402 are applicable to the present invention. In addition, the present invention conforms to the physical start and stop positions in a variety of optical recording medium standards.

Figure 6A:
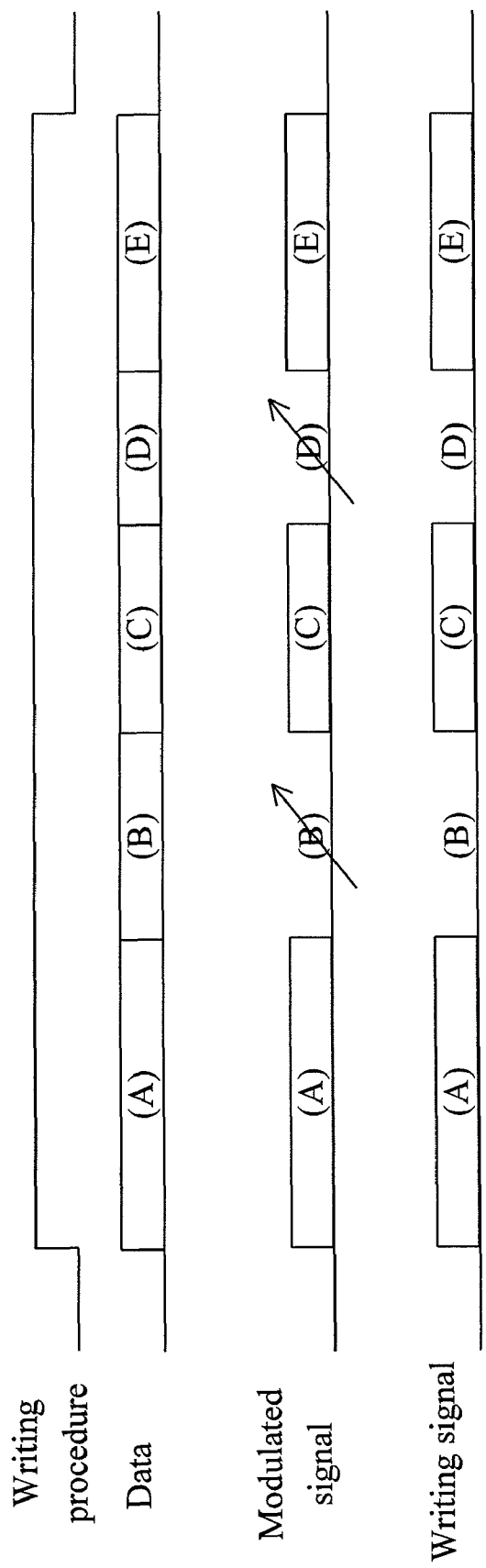
FIG. 6A is a schematic timing diagram that the recording controller in FIG. 4 controls the modulation unit to adjust the modulated signal according to one embodiment of the present invention.

FIG. 6A is a timing diagram that the recording controller 408 in FIG. 4 controls the modulation unit 406a to adjust the modulated signal 418 according to one embodiment of the present invention. While data 412 including areas A to E are ready for recording during the writing procedure, the recording controller 408 controls the modulated signal 420 of the modulation unit 406a based on desired and undesired recording areas. The desired areas are composed of areas A, C and E, and the undesired areas are composed of areas B and D. The adjusted modulation signal 420 is converted into the writing signal 416. Both the desired area is adjusted to be low level signals and the undesired area is adjusted to be high level signals by the recording controller 408. The OPU 418 performs part-recording on desired areas A, C and E, and undesired areas B and D.

In one embodiment, while receiving the reference clock signal 410a, the recording controller 408 identifies the desired and undesired recording areas in the data 412 and adjusts theses areas by referring the reference clock signal 410a so that the modulation unit 406a outputs the adjusted modulation signal 420. In another embodiment, while receiving address signal 410b from the address detector 404b, the recording controller 408 identifies the addresses recorded on the optical recording medium 402 and, thereby, adjusts the modulated signal 420 according to the address signal 410b and the reference clock signal 410a. More specifically, the recording controller 408 calculates the duration of the address by counting the reference clock signal 410a and adjusts the length of the desired recording area and undesired recording areas in the modulated signal 420.

Figure 6B:
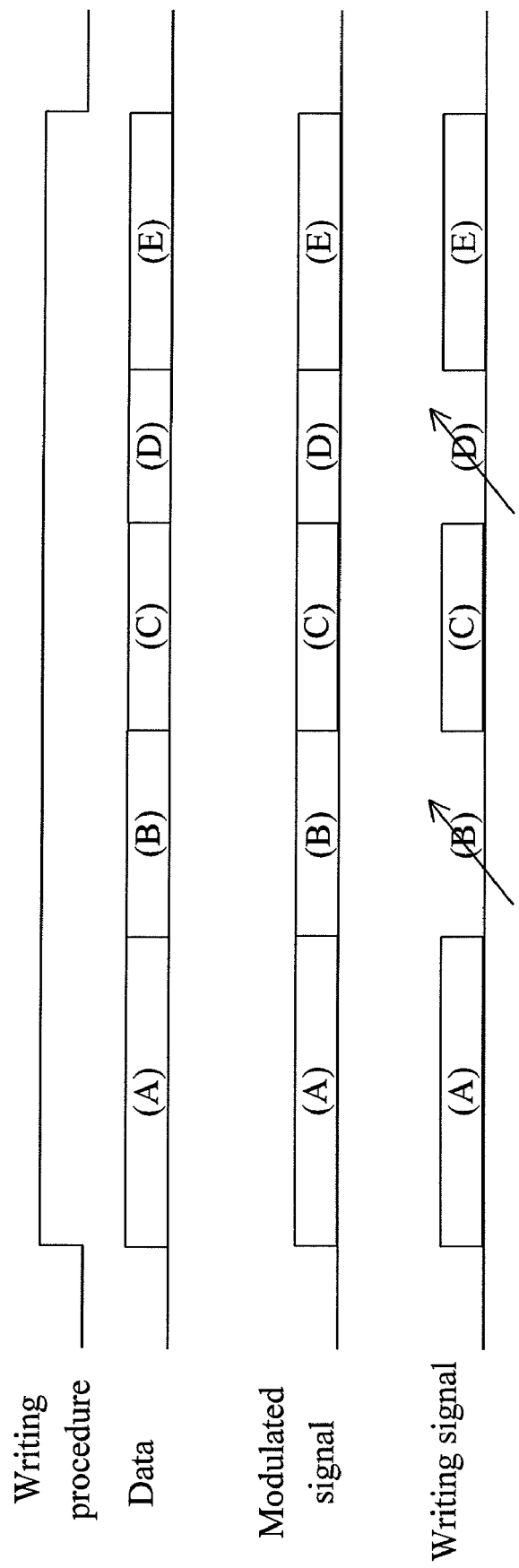
FIG. 6B is a schematic timing diagram that the recording controller in FIG. 4 controls the write-strategy unit to adjust the writing signal according to one embodiment of the present invention.

FIG. 6B is a timing diagram that the recording controller 408 in FIG. 4 controls the write-strategy unit 406b to adjust the writing signal 416 according to one embodiment of the present invention. The data 412 is modulated into the modulated signal 420. Similar to FIG. 6A, while areas A to E in the data are ready during the writing procedure, the recording controller 408 then controls the writing signal 416 of the write-strategy unit 406b based on desired and undesired recording areas. Both the desired recording area is adjusted to be low level signals and the undesired recording area is adjusted to be high level signals by the recording controller 408.

In one embodiment, while receiving the reference clock signal 410a, the recording controller 408 identifies the desired and undesired recording areas in the data and adjusts theses areas by referring the reference clock signal 410a so that the write-strategy unit 406b outputs the adjusted writing signal 416. In another embodiment, the recording controller 408 identifies the desired and undesired recording areas in the writing signal 416 and then adjusts the writing signal 416 by referring the address signal 410b.

Preferably, the undesired recording area during a part-recording process is generated by emitting zero-level laser power onto the optical recording medium 402 via the OPU 418. It should be noted that the sequential writing comprises one or the combination of writing information onto the recording medium 402 or erasing information from the optical recording medium 402 when the OPU 418 emits the light corresponding to the adjusted writing signal on the recording optical medium 402.

Figure 6C:
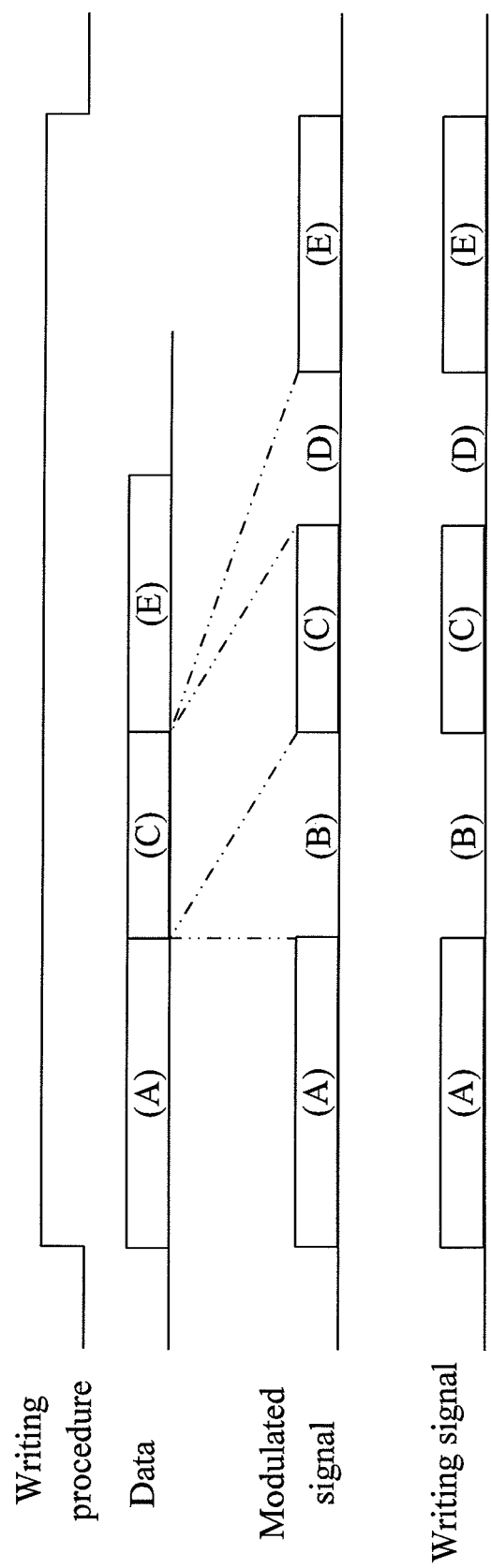
FIG. 6C is a schematic timing diagram that the recording controller in FIG. 4 controls the data-preparing unit to adjust the modulated signal or writing signal which are transformed from discontinuous data areas according to one embodiment of the present invention.

FIG. 6C is a timing diagram that the recording controller 408 in FIG. 4 controls the data-preparing unit 406 to adjust the modulated signal 420 or writing signal which are transformed from discontinuous data areas according to one embodiment of the present invention. The recording controller 408 controls the discontinuous data, including areas A, C and E, so that the modulation unit 406a outputs the modulated signal 420 having desired areas A, C and E, and undesired areas B and D. The modulated signal 420 then is converted into the writing signal 416 having the same areas thereof.

In one embodiment, while receiving the reference clock signal 410a, the recording controller 408 adjusts the order of areas A, C and E in order to insert area B in-between areas A and C and insert area D in-between C and E by referring the reference clock signal 410a so that the modulation unit 406a outputs the adjusted writing signal having desired areas A, C and E, and undesired areas B and D. Alternatively, in another embodiment, the recording controller 408 controls the write-strategy unit 406b to adjust the writing signal 416 by referring the address signal 410b such that the write-strategy unit 406b outputs the adjusted writing signal 416 having desired areas A, C and E, and undesired areas B and D.

In the present invention, the desired and undesired recording areas of the optical recording medium 402 includes continuous embossed and recorded addresses, or addressable units and positions. The part-recording units comprise record data unit e.g. ECC or Address in Pre-groove (ADIP) length, physical address unit, and recorded address unit, e.g. sector. ECC is suitable for the DVD data block, physical address unit is used in Recordable Area Indicator (RAI) and PDL standards, and recorded address unit (sector) is employed for DVD-R DL ODTA standard.

Additionally, the control system 400 as shown in FIG. 4 in the present invention is suitable for a control data zone in DVD-RW and DVD-R, for a next border marker in DVD-R, for RAI in DVD+R and DVD-R DL ODTA, for multiple replace blocks or skip defect blocks (defect management) of DVD+MRW, and for multiple SDL replace blocks or skipping defect blocks (defect management) of DVD-RAM.

Figure 7A:
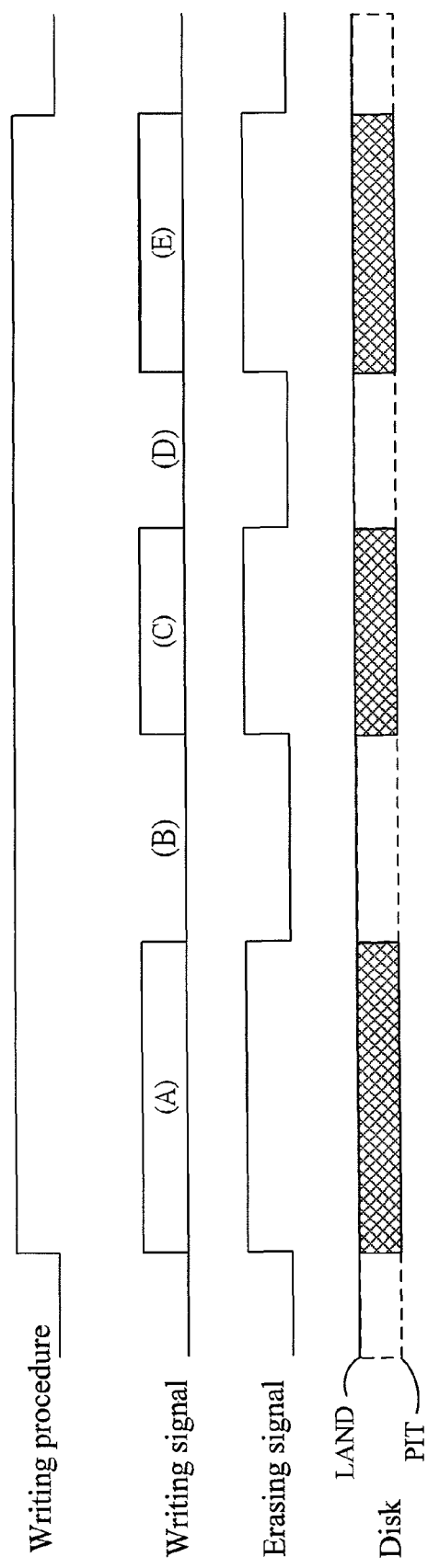
FIGS. 7A-7C are schematic timing diagrams that the recording controller in FIG. 4 controls the write-strategy unit to adjust the writing signal and erasing signal according to one embodiment of the present invention.
Figure 7B:
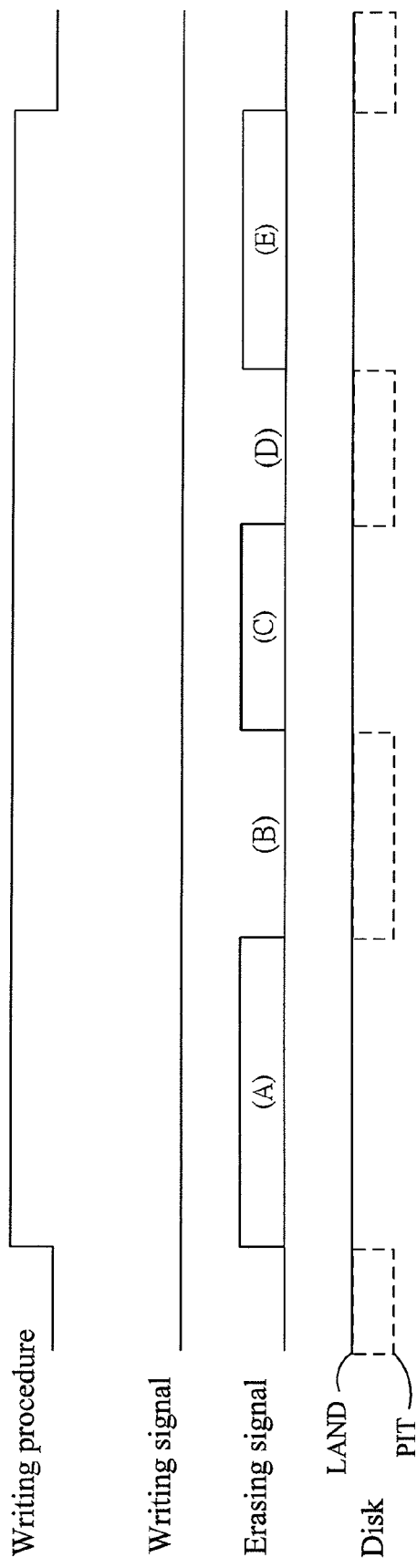
Figure 7C:
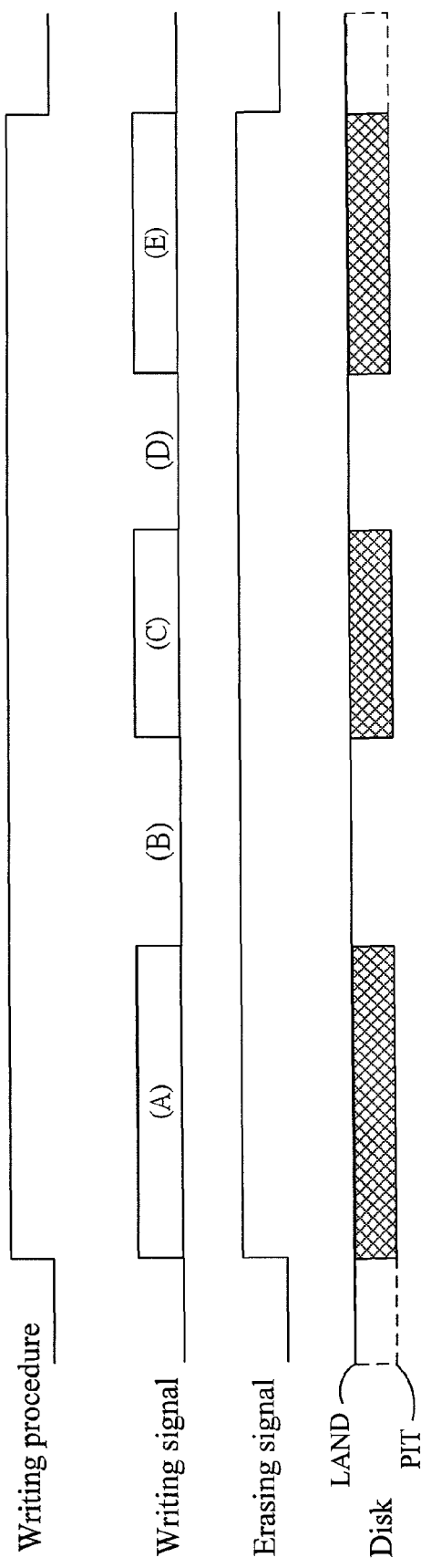

Further, the recording controller 408 controls writing signal 416, erasing signal, or the combination to be applicable to several recordable and rewritable media, as shown in FIGS. 7A-7C. These schematic timing diagrams depicts that the recording controller 408 in FIG. 4 controls the write-strategy unit 406b to adjust the writing signal 416 and erasing signal according to one embodiment of the present invention. In FIG. 7A, during the writing procedure, the recording controller 408 controls the data-preparing unit 406 to adjust the erasing signal so that the OPU 418 erases the disk according to the erasing signal. Further, the writing signal 416 is transmitted into the OPU 418 and the OPU 418 emits light based on the writing signal 416 to form a land/pit profile on the optical recording medium 402. Similar to FIG. 7A, in FIG. 7B, the writing signal 416 is adjusted by the recording controller 408 to generate writing signal in low level and the erasing signal, including areas A to E. The OPU 418 emits light based on the writing signal 416 and erasing signal onto the disk. FIG. 7C is contrary to FIG. 7B, the writing signal 416 is adjusted to generate desired recording areas, including areas A, C and E, and the undesired recording areas, including areas B and D. The erasing signal is adjusted to generate high level. The OPU 418 emits light based on the writing signal and erasing signal.

Figure 8A:
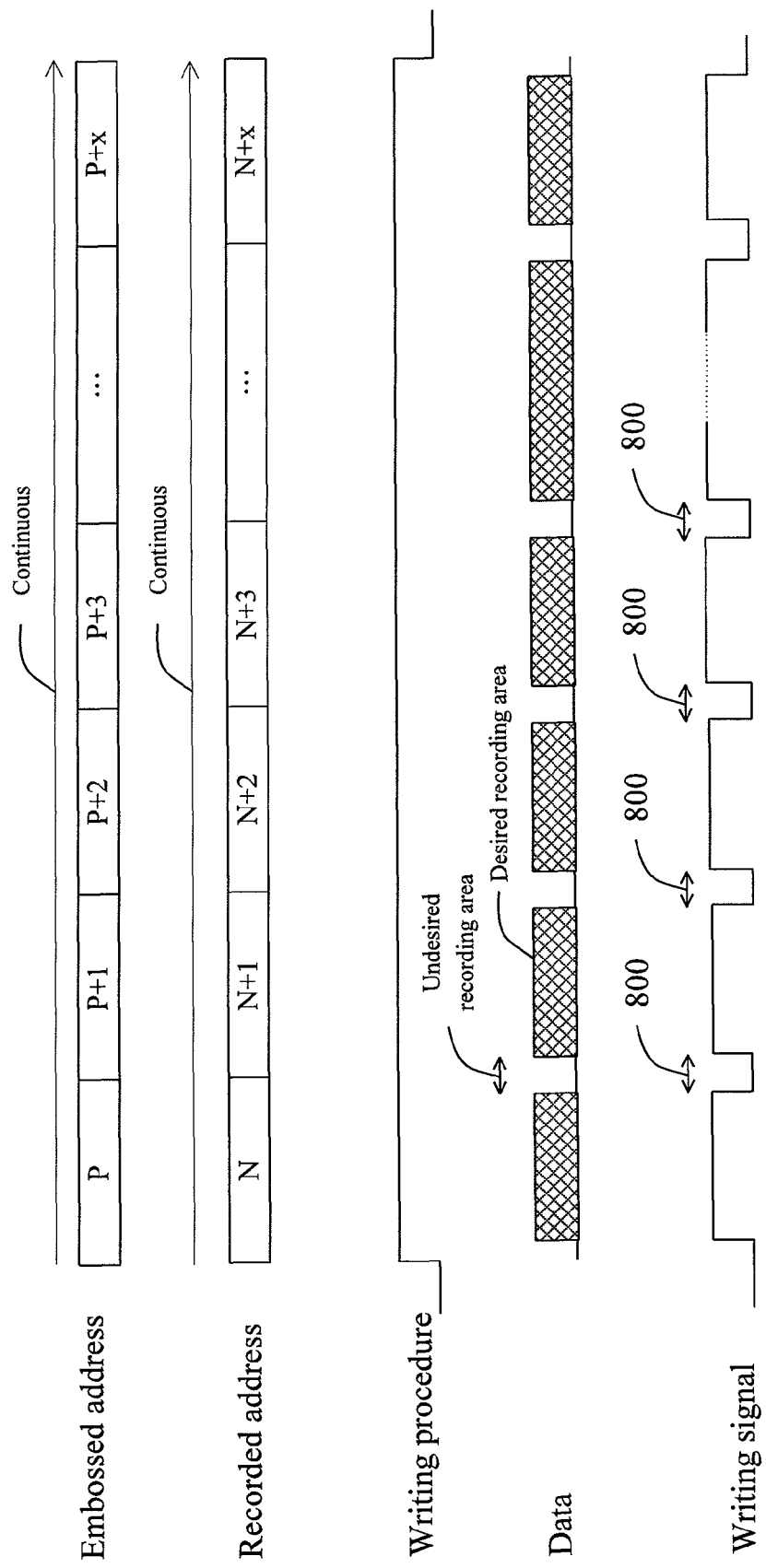
FIGS. 8A and 8B are schematic timing diagrams that the recording controller in FIG. 4 adjusts the writing signal by referring address signal according to one embodiment of the present invention.
Figure 8B:
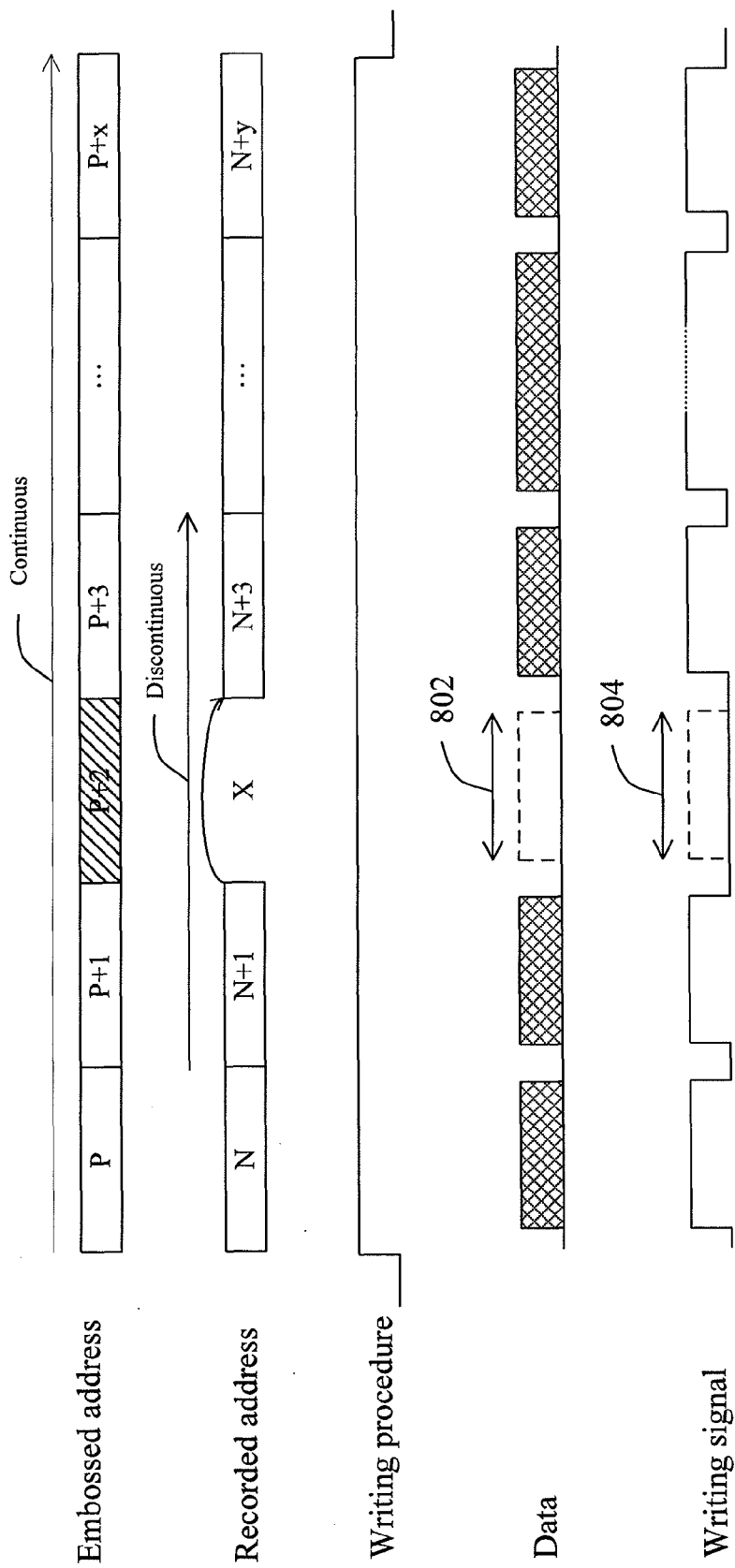

FIGS. 8A and 8B are schematic timing diagrams that the recording controller 408 in FIG. 4 adjusts the writing signal by referring address signal 410b according to one embodiment of the present invention. The embossed address on the optical recording medium 402 is used to position the OPU 418 and the embossed addresses are continuous, e.g. addresses P to (P+x), where x is positive integer. The recorded address is addressable indication of which the data is recorded on the optical recording medium 402. For example, the recorded address ranges from addresses N to (N+x) or (N+y), where x and y are positive integer. Preferably, both the unit and domain of the embossed address and these of the recorded address are same or different.

In FIG. 8A, the embossed address and the recorded address are continuous during the writing procedure. The recording controller 408 identifies the undesired recording area between desired recording areas by referring reference clock signal and/or address signal, and here the undesired recording area corresponds to the embossed addresses therebetween, e.g. addresses N and (N+1). More importantly, the recording controller 408 adjusts the writing signal 416 so that the position or length of the undesired recording area is addressable by calculating reference clock signal 410a and/or address signal 410b, as shown in number 800.

In FIG. 8B, when the embossed address has PDL defect area, i.e. address (P+2), the recording controller 408 adjust the recorded address according to the address signal 410b of the address detector 404b and, thus, the recorded address is discontinuous. However, the recording controller 408 controls the data-preparing unit 406 to adjust the defect area in the data by referring address signal 410*b*, as shown in number 802. Further, the defect area in the writing signal corresponding to that in the data is also modified by the recording controller 408, as shown in number 804.

Figure 9A:
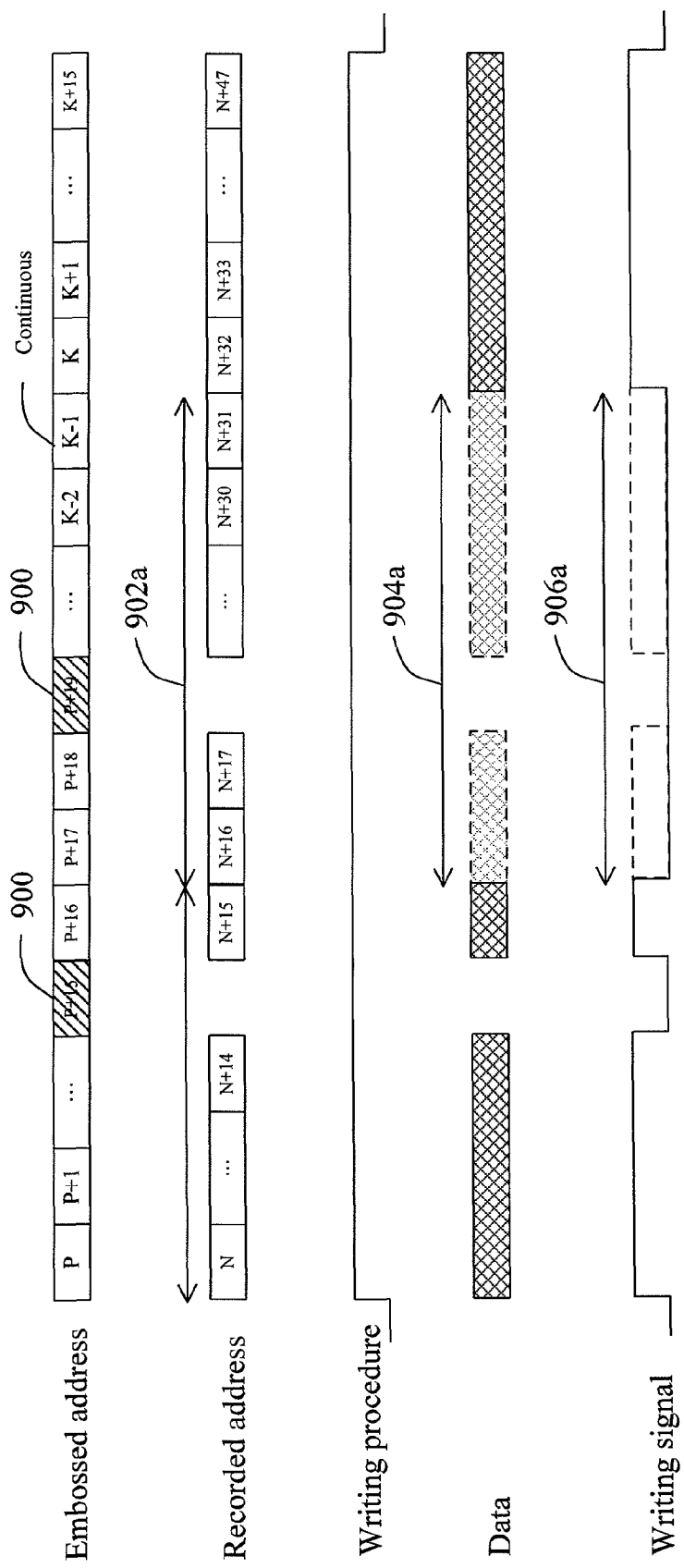
FIGS. 9A and 9B are schematic timing diagrams that the recording controller in FIG. 4 adjusts the writing signal corresponding to Secondary Defect List (SDL) according to one embodiment of the present invention.
Figure 9B:
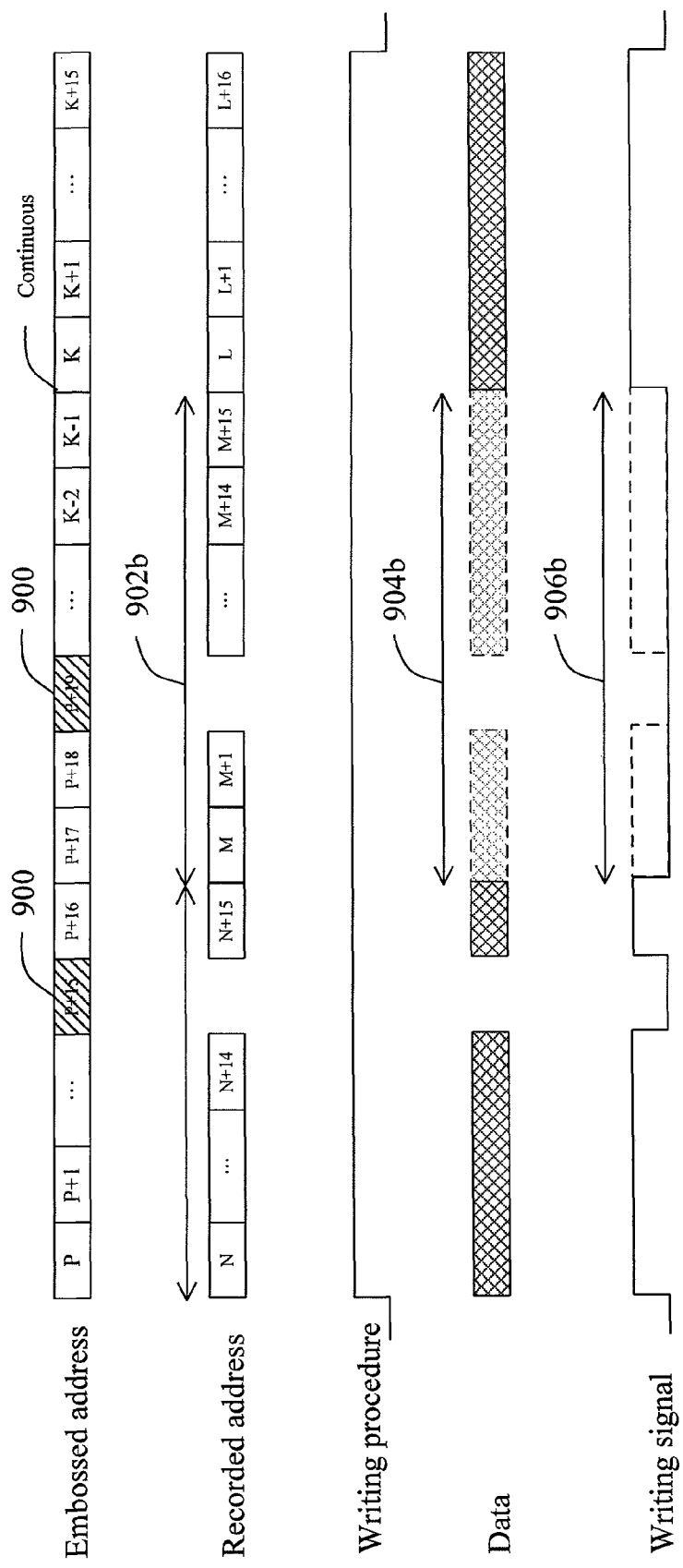

FIGS. 9A and 9B are schematic timing diagrams that the recording controller 408 in FIG. 4 adjusts the writing signal 416 corresponding to SDL according to one embodiment of the present invention. In FIG. 9A, when the embossed address has PDL defect area 900, i.e. embossed addresses (P+15) and (P+19), and SDL defect area 902*a*, i.e. recorded addresses (N+16) to (N+31), the recording controller 408 identifies SDL defect area in the recorded address. The embossed addresses are continuous and the recorded addresses are discontinuous. Specifically, the recording controller 408 controls the data-preparing unit 406 to adjust the defect area 904*a* in the data by referring address signal 410*b* of the address detector 410. The defect area 904*a* of the data corresponds to the SDL defect area 902*a*. Further, the undesired recording area 906*a* in the writing signal 416 corresponding to the SDL defect area 902*a* is also modified by the recording controller 408. Preferably, the undesired recording area 906*a* is adjusted according to record unit of the recorded address and the record unit is calculated by the reference clock signal 410*a* or the address signal 410*b*.

Similar to FIG. 9A, in FIG. 9B, when writing multi-SDL 900 in spare area, the recording controller 408 identifies replaced area 902*b* in the recorded addresses. Advantageously, the recording controller 408 adjusts the replaced area 904*b* in the data 412 by referring address signal 410*b* of the address detector 410. The replaced area 904*b* corresponds to the SDL replaced area 902*b*. Further, the replaced area 906*b* in the writing signal corresponding to the SDL replaced area 904*b* in the data is also modified by the recording controller 408. Preferably, the undesired recording area 906*b* is adjusted according to the reference clock signal 410*a* or the address signal 410*b*.

Figure 10:
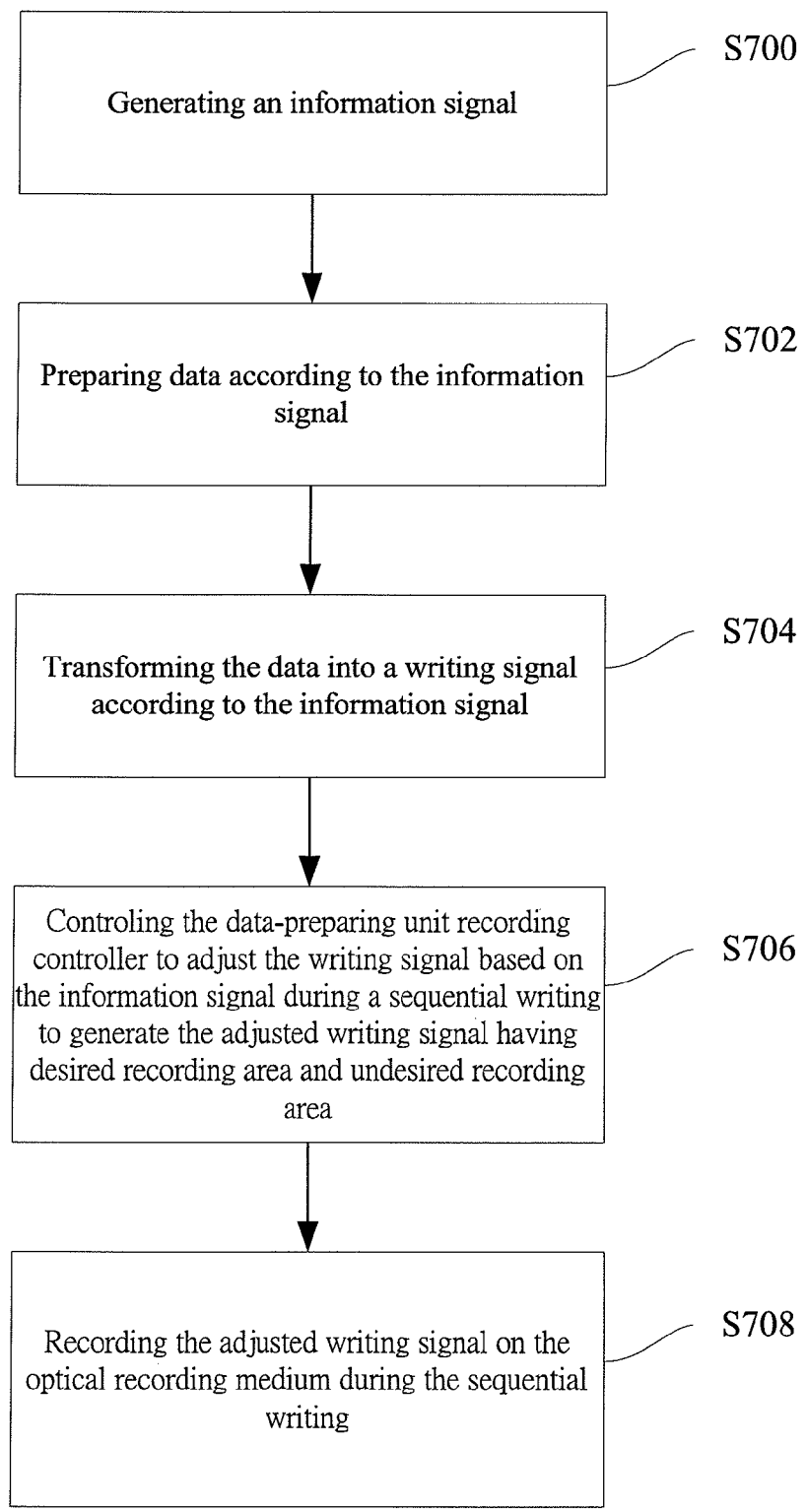
FIG. 10 is a flow chart of controlling data recording process of an optical recording medium according to one preferred embodiment of the present invention.

FIG. 10 is a flow chart of controlling data recording process of an optical recording medium according to one preferred embodiment of the present invention. In step S700, an information unit 404 generates an information signal 410. In step S702, data-preparing unit 406 prepares data according to the information signal 410. In step S704, data-preparing unit 406 transforms the data 412 into a writing signal 416 according to the information signal 410. In step S706, the recording controller 408 then controls the data-preparing unit 406 to allow the recording controller 408 to adjust the writing signal 416 based on the information signal 410 during a sequential writing to generate the adjusted writing signal having desired recording area and undesired recording area. Finally, in step S708, the adjusted writing signal 416 is recorded on the optical recording medium 402 during the sequential writing.

In one embodiment, a reference clock generator 404*a* generates a reference clock signal 410*a* and the reference clock signal 410*a* serves as the information signal 410 which is supplied to the data-preparing unit 406 for operation. During the step of transforming the data 412 into the writing signal 416, the data 412 is modulated into a modulated signal 420 according to the reference clock signal 410*a*. The recording controller 408 adjusts the modulation signal 420 based on the reference clock signal 410*a*. Preferably, the recording controller 408 adjusts the position of the desired recording area and undesired recording areas in the writing signal 416 by counting the reference clock signal 410*a*. The recording controller 408 adjusts the length of the desired recording area and undesired recording areas in the writing signal 416 by counting the reference clock signal 410*a*.

In another embodiment, an address detector 404*b* generates an address signal 410*b* serving as the information signal 410 corresponding to the optical recording medium 402. The address signal 410*b* is supplied to data-preparing unit 406 for detection. During the step of transforming the data 412 into the writing signal 416, the data 412 is modulated into the modulated signal 420 according to the address signal 410*b*. The recording controller 408 adjusts the modulation signal 420 based on the address signal 410*b*. Preferably, the recording controller 408 adjusts the position of the desired recording area and undesired recording areas in the writing signal 416 by counting the address signal 410*b*. Further, the recording controller 408 adjusts the length of the desired recording area and undesired recording areas in the writing signal 416 by counting the address signal 410*b*.

The advantages of the present invention mainly include: (a) performing a part-recording process in a sequential writing to avoid invalid tracking of the next starting position when two adjacent desired areas in the optical recording medium are too close; and (b) adjusting writing signal between data source and an optical pick-up (OPU) to record the adjusted writing signal on the optical recording medium in a sequential writing to improve the poor quality or the unreliable detection of physical address on the optical recording medium.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A control system for controlling data recording process of an optical recording medium, the control system comprising:
an information unit, generating an information signal;
a data-preparing unit coupled to the information unit, preparing data and transforming the data into a writing signal according to the information signal; and
a recording controller coupled to the information unit and the data-preparing unit, controlling the data-preparing unit to adjust the writing signal while acquiring the information signal from the information unit during a sequential writing, wherein the recording controller adjusts the writing signal according to the information signal, the data-preparing unit outputs the adjusted writing signal having desired recording area and undesired recording area, and the adjusted writing signal is recorded on the optical recording medium during the sequential writing.

2. The control system of claim 1, wherein the information unit comprises a reference clock generator coupled to the data-preparing unit, supplying the data-preparing unit with a reference clock signal which serves as the information signal.

3. The control system of claim 2, wherein the data-preparing unit comprises a modulation unit coupled to the reference clock generator, modulating the data into a modulated signal according to the reference clock signal.

4. The control system of claim 3, wherein the recording controller adjusts the modulation signal based on the reference clock signal and the modulation unit outputs the writing signal.

5. The control system of claim 2, wherein the data-preparing unit comprises a write-strategy unit coupled to the reference clock generator, converting the data into the writing signal according to the reference clock signal.

6. The control system of claim 5, wherein the recording controller adjusts the writing signal based on the reference clock signal and controls the write-strategy unit to generate the writing signal.

7. The control system of claim 2, wherein the recording controller counts the reference clock signal to adjust the position of the desired recording area and undesired recording areas in the writing signal.

8. The control system of claim 2, wherein the recording controller counts the reference clock signal to adjust the length of the desired recording area and undesired recording areas in the writing signal.

9. The control system of claim 1, wherein the information unit comprises an address detector coupled to the data-preparing unit, supplying the recording controller with an address signal which serves as the information signal corresponding to the optical recording medium.

10. The control system of claim 9, wherein the data-preparing unit comprises a modulation unit coupled to the recording controller for modulating the data into a modulated signal and the recording controller controls the modulation unit for adjusting the modulation signal based on the address signal to generate the writing signal.

11. The control system of claim 9, wherein the data-preparing unit comprises a write-strategy unit coupled to the recording controller for converting the data into the writing signal and the recording controller controls the write-strategy unit for adjusting the writing signal based on the address signal to generate the writing signal.

12. The control system of claim 9, wherein the recording controller detects the address signal to adjust the position of the desired recording area and undesired recording areas in the writing signal.

13. The control system of claim 9, wherein the recording controller detects the address signal to adjust the length of the desired recording area and undesired recording areas in the writing signal.

14. A control method for controlling data recording process of an optical recording medium, the control method comprising the steps of:
generating an information signal;
preparing data according to the information signal;
transforming the data into a writing signal according to the information signal;
adjusting the writing signal based on the information signal during a sequential writing to generate the adjusted writing signal having desired recording area and undesired recording area; and
recording the adjusted writing signal on the optical recording medium during the sequential writing.

15. The method of claim 14, further comprising supplying a reference clock signal which serves as the information signal.

16. The method of claim 15, during the step of transforming the data into the writing signal, further comprising modulating the data into a modulated signal according to the reference clock signal.

17. The method of claim 16, further comprising adjusting the modulation signal based on the reference clock signal.

18. The method of claim 15, further comprising adjusting the position of the desired recording area and undesired recording areas in the writing signal by counting the reference clock signal.

19. The method of claim 15, further comprising adjusting the length of the desired recording area and undesired recording areas in the writing signal by counting the reference clock signal.

20. The method of claim 14, further comprising supplying an address signal which serves as the information signal corresponding to the optical recording medium.

21. The method of claim 20, during the step of transforming the data into the writing signal, further comprising modulating the data into a modulated signal according to the address signal.

22. The method of claim 21, further comprising adjusting the modulation signal based on the address signal.

23. The method of claim 20, further comprising adjusting the position of the desired recording area and undesired recording areas in the writing signal by counting the address signal.

24. The method of claim 20, further comprising adjusting the length of the desired recording area and undesired recording areas in the writing signal by counting the address signal.

* * * * *